US005996984A

United States Patent [19]

Takahashi

[11] Patent Number: 5,996,984

[45] Date of Patent: Dec. 7, 1999

[54] CYLINDER APPARATUS

[75] Inventor: Kazuyoshi Takahashi, Tokyo, Japan

[73] Assignee: SMC Kabushiki Kaisha, Tokyo, Japan

[21] Appl. No.: 09/032,839

[22] Filed: Mar. 2, 1998

[30] Foreign Application Priority Data

| | | | |
|---|---|---|---|
| Mar. 5, 1997 | [JP] | Japan | 9-050768 |
| Jun. 27, 1997 | [JP] | Japan | 9-172403 |

[51] Int. Cl.[6] .......... B23Q 3/08

[52] U.S. Cl. .......... 269/32; 269/27; 269/228

[58] Field of Search .......... 269/32, 25, 27, 269/31, 33, 228, 201, 24, 233

[56] References Cited

U.S. PATENT DOCUMENTS

| | | | |
|---|---|---|---|
| 3,027,155 | 3/1962 | Paterson | 269/32 |
| 4,723,767 | 2/1988 | McPherson et al. | 269/32 |
| 4,887,803 | 12/1989 | Witt | 269/32 |
| 4,905,973 | 3/1990 | Blatt | 269/32 |
| 5,165,670 | 11/1992 | Sawdon | 269/32 |
| 5,171,001 | 12/1992 | Sawdon | 269/32 |
| 5,687,961 | 11/1997 | Horn | 269/32 |

FOREIGN PATENT DOCUMENTS 295 04 267 U 8/1995 Germany .

*Primary Examiner*—David A. Scherbel
*Assistant Examiner*—Lee Wilson
*Attorney, Agent, or Firm*—Oblon, Spivak, McClelland, Maier & Neustadt, P.C.

[57] ABSTRACT

A cylinder apparatus comprises a body having a flat rectangular parallelepiped shape, a cylinder unit for accommodating a piston which is reciprocatable along a cylinder chamber, a toggle link mechanism for converting linear motion of a piston rod into rotational motion, and an arm for making rotation by a predetermined angle in accordance with a driving action of the cylinder unit, wherein reaction force-receiving plates for absorbing reaction force applied when a workpiece is clamped are detachably provided in the body.

9 Claims, 16 Drawing Sheets

CYLINDER APPARATUS

BACKGROUND OF THE INVENTION

1. Field of the Invention

The present invention relates to a cylinder apparatus capable of clamping a workpiece by the aid of an arm which is rotatable by a predetermined angle in accordance with a displacing action of a piston.

2. Description of the Related Art

When components of an automobile are welded, for example, a cylinder apparatus has been hitherto used to clamp such a component. The cylinder apparatus is disclosed, for example, in U.S. Pat. No. 4,905,973 and DE 29504267 U1.

The cylinder apparatus disclosed in U.S. Pat. No. 4,905,973 and DE 29504267 U1 comprises a main body which is constructed by integrally assembling a pair of casings formed to be substantially symmetrical to one another, a cylinder unit which is connected to the main body, and an arm which is rotatable by a predetermined angle in accordance with a driving action of the cylinder unit by the aid of a toggle link mechanism provided in the main body.

The cylinder unit is provided with a piston which is reciprocatively accommodated in a cylinder tube, and a piston rod which is connected to the piston. The toggle link mechanism, which comprises a bearing member for rotating the arm, is connected to a free end of the piston rod. A guide groove is formed on an inner wall surface of the casing, which functions to guide the linearly movable piston and absorb the reaction force applied when a workpiece is clamped by the arm.

A desired welding operation is performed for the workpiece while clamping the workpiece by the aid of the arm which is rotatable by a predetermined angle in accordance with the driving action of the cylinder unit.

However, the cylinder apparatus disclosed in U.S. Pat. No. 4,905,973 and DE 29504267 U1 adopts an arrangement in which the reaction force is applied to the arm when the workpiece is clamped by the arm, and the reaction force is received by the guide groove formed on the inner wall surface of the casing. In this arrangement, the wall surface for constructing the guide groove wears out due to sliding friction of the piston rod which is reciprocated integrally with the piston. Therefore, backlash or looseness occurs resulting from a gap between the piston rod and the guide groove, and it becomes difficult to rotate the arm in a stable manner. Further, a disadvantage arises in that the occurrence of backlash decreases the clamping force of the arm for the workpiece.

SUMMARY OF THE INVENTION

A general object of the present invention is to provide a cylinder apparatus which makes it possible to avoid occurrence of any backlash resulting from the reaction force generated when a workpiece is clamped so that the an arm may be rotated in a stable manner.

A principal object of the present invention is to provide a cylinder apparatus which makes it possible to exclude the decrease in clamping force resulting from the backlash.

Another object of the present invention is to provide a cylinder apparatus which makes it possible to mutually and conveniently reassemble the cylinder apparatus of the right arm type Into the cylinder apparatus of the left arm type.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
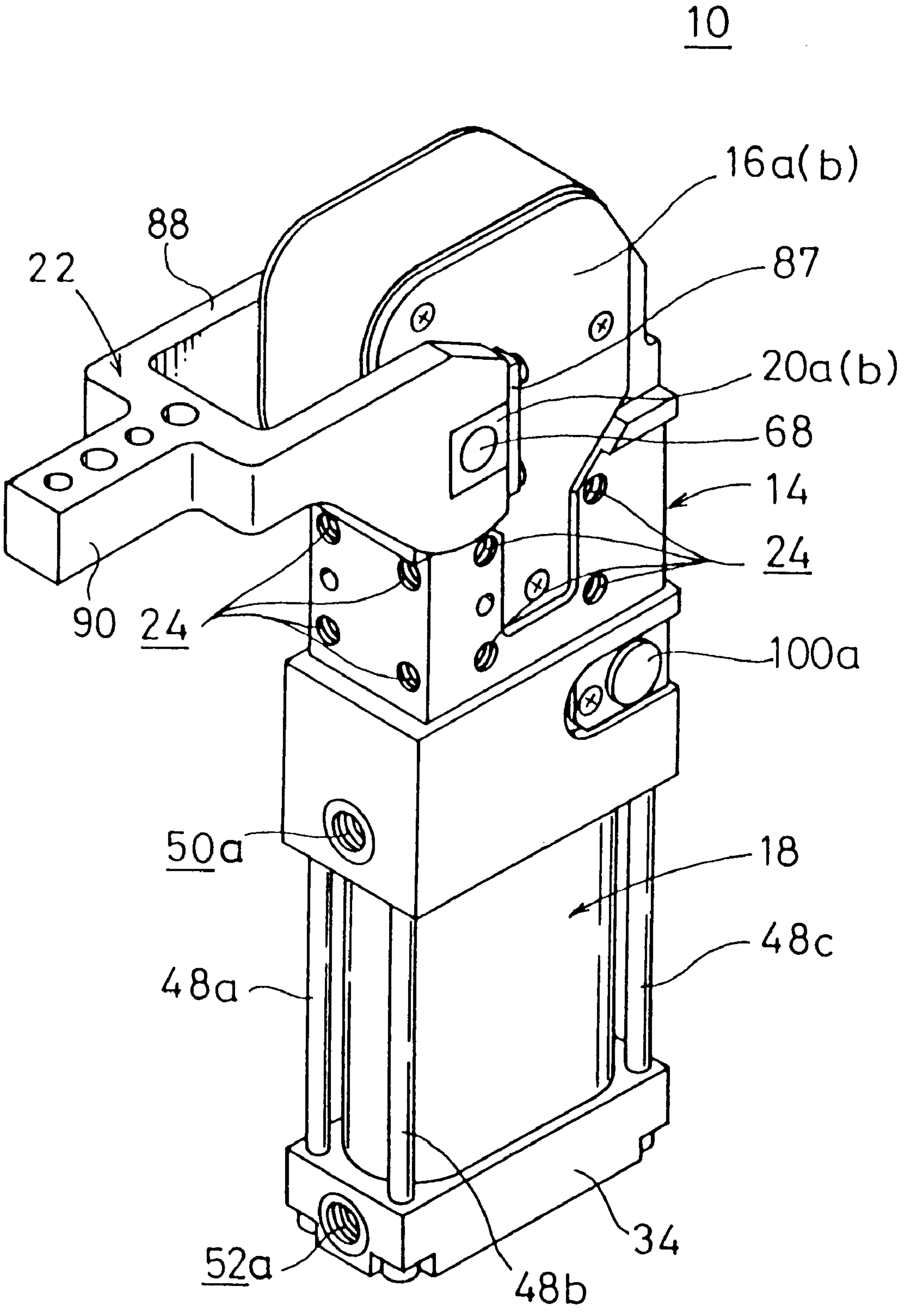
FIG. 1 shows a perspective view of a cylinder apparatus according to a first embodiment of the present invention.

In FIG. 1, reference numeral 10 indicates a cylinder apparatus according to a first embodiment of the present invention. The cylinder apparatus 10 comprises a body 14 formed to be flat in an integrated manner and having a pair of mutually communicating openings 12*a*, 12*b* (see FIG. 3), a pair of cover members 16*a*, 16*b* for closing the openings 12*a*, 12*b* of the body 14 respectively, a cylinder unit 18 connected to a lower end of the body 14 in an air-tight manner, and an arm 22 connected to bearing sections 20*a*, 20*b* having a square-shaped cross section and protruding to the outside from the cover members 16*a*, 16*b*. A plurality of holes 24 are formed on a plurality of side surfaces of the body 14, for attaching the cylinder apparatus 10, for example, to another member or a wall surface.

Figure 4:
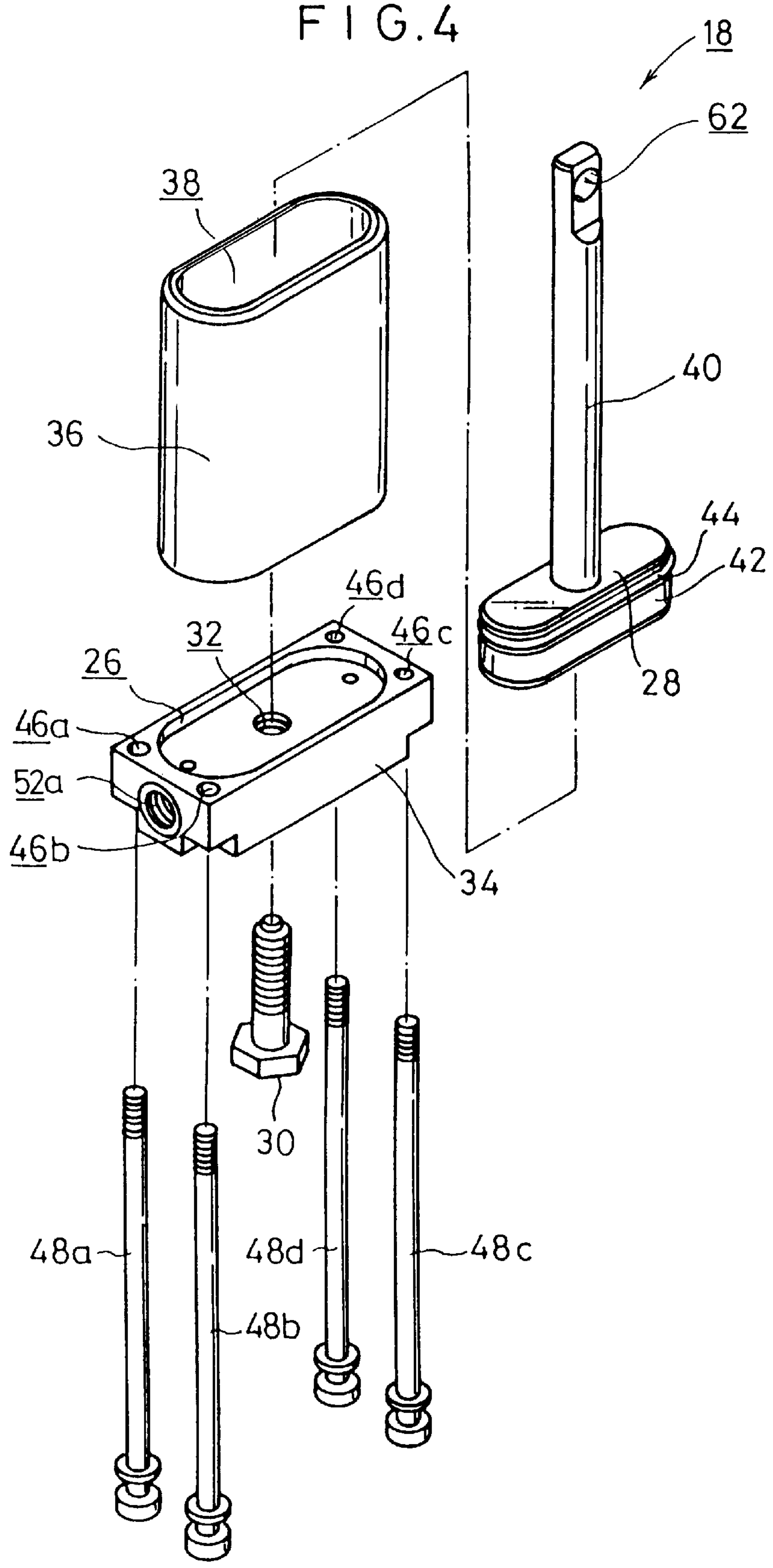
FIG. 4 shows an exploded perspective view of a cylinder unit for constructing the cylinder apparatus shown in FIG. 1.

As shown in FIG. 4, the cylinder unit 18 comprises an end block 34 and a cylinder tube 36. The end block 34 includes an elliptic recess 26 formed on an upper surface, and a screw member 30 screwed through a lower surface into a screw hole 32 for adjusting the displacement amount of a piston 28. The cylinder tube 36 is composed of a cylinder having an elliptic cross section with its one end connected to the recess 26 of the end block 34 in an air-tight manner and the other end connected to a bottom surface of the body 14 in an air-tight manner.

Figure 5:
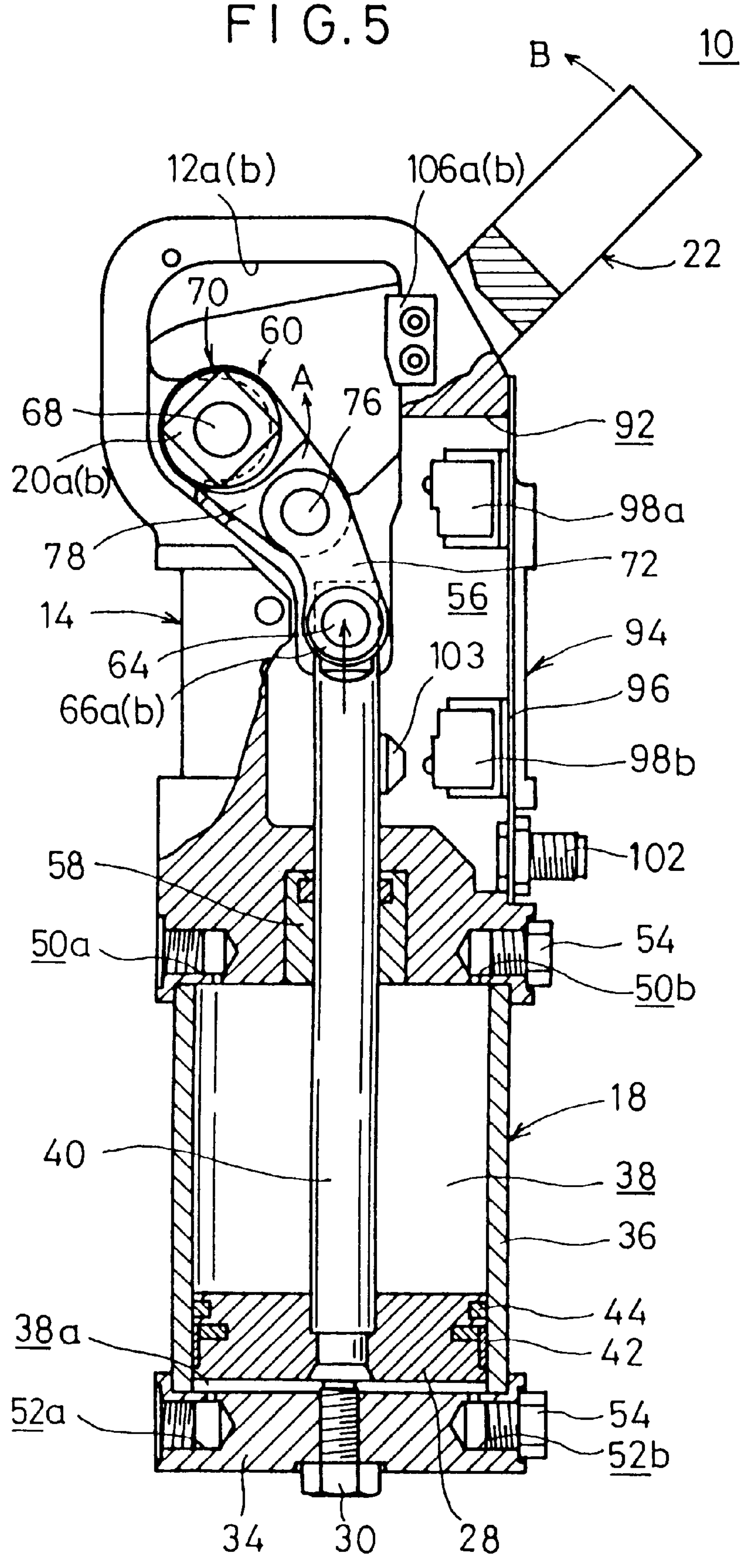
FIG. 5 shows a partial longitudinal sectional view of the cylinder apparatus shown in FIG. 1.

As shown in FIG. 5, the cylinder unit 18 further comprises the piston 28 which is accommodated in the cylinder tube 36 and which is reciprocative along a cylinder chamber 38, and a lengthy piston rod 40 which is connected to the center of the piston 28 and which is displaceable integrally with the piston 28.

A wear ring 42 and a seal ring 44 are installed to an outer circumferential surface of the piston 28 respectively. Attachment holes 46*a* to 46*d* are bored through four corners of the end block 34. The end block 34 and the cylinder tube 36 are assembled to the body 14 in an air-tight manner by the aid of four shafts 48*a* to 48*d* inserted into the attachment holes 46*a* to 46*d*. Pairs of mutually opposing pressurized fluid inlet/outlet ports 50*a*, 50*b*, 52*a*, 52*b* for introducing and discharging a pressurized fluid into and from the cylinder chamber 38 respectively are formed in the body 14 and the end block 34 respectively. When the cylinder apparatus 10 is actually used, blind plugs 54 are screwed into ones of the pressurized fluid inlet/outlet ports 50*b*, 52*b* respectively to be used in a state in which the ones of the pressurized fluid inlet/outlet ports 50*b*, 52*b* are closed as shown in FIGS. 5 and 6.

Figure 6:
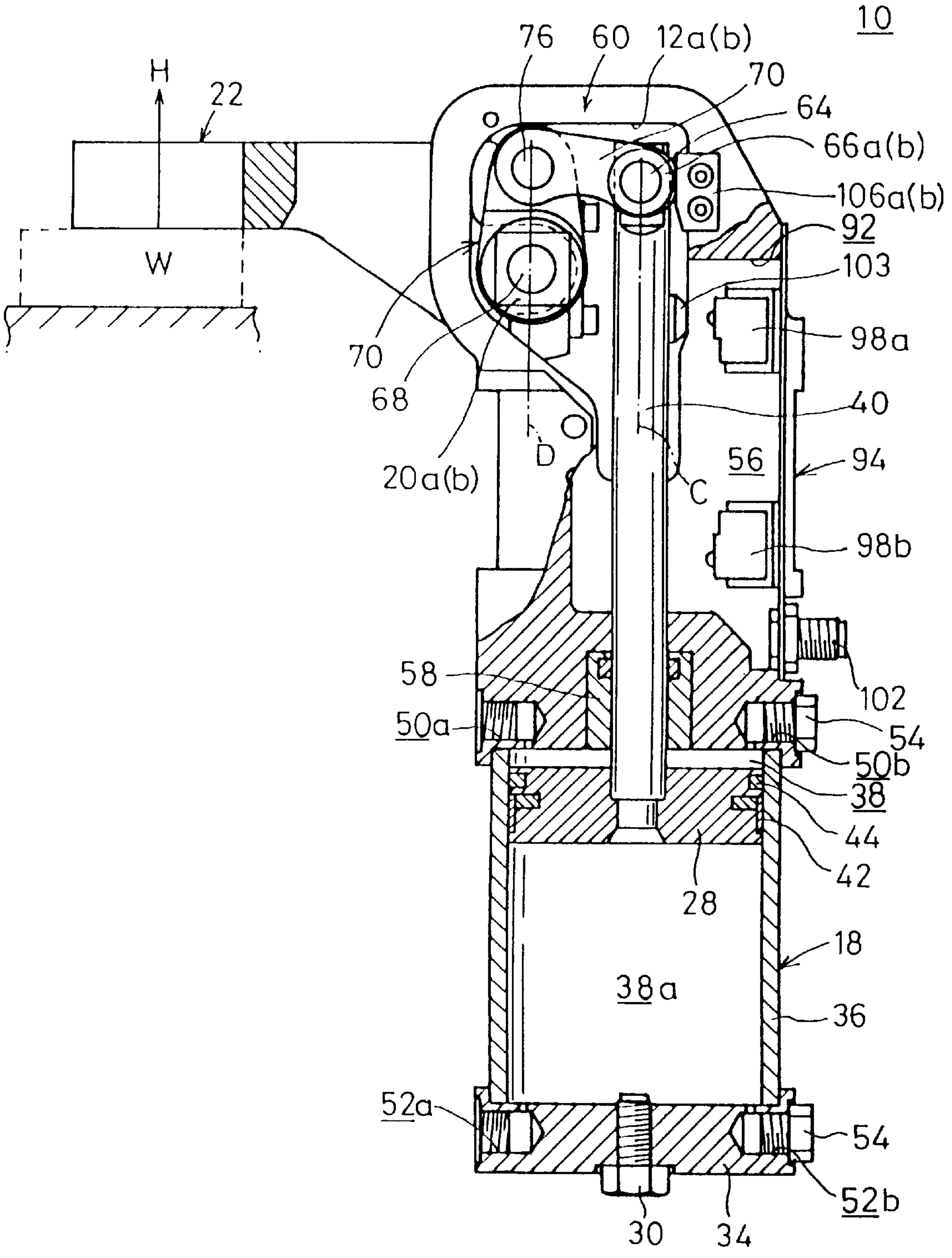
FIG. 6 shows a partial longitudinal sectional view illustrating a state in which an arm shown in FIG. 5 is rotated by a predetermined angle.

As shown in FIGS. 5 and 6, a chamber 56, which communicates with the pair of openings 12*a*, 12*b* formed on the both sides respectively, is formed in the body 14. The chamber 56 is provided so that a free end of the piston rod 40 faces the chamber 56. In this embodiment, the piston rod 40 is guided linearly and reciprocatively by a bush 58 which is fixed on a side of the lower end of the body 14 and the wear ring 42 which is installed to the outer circumferential surface of the piston 28.

Figure 3:
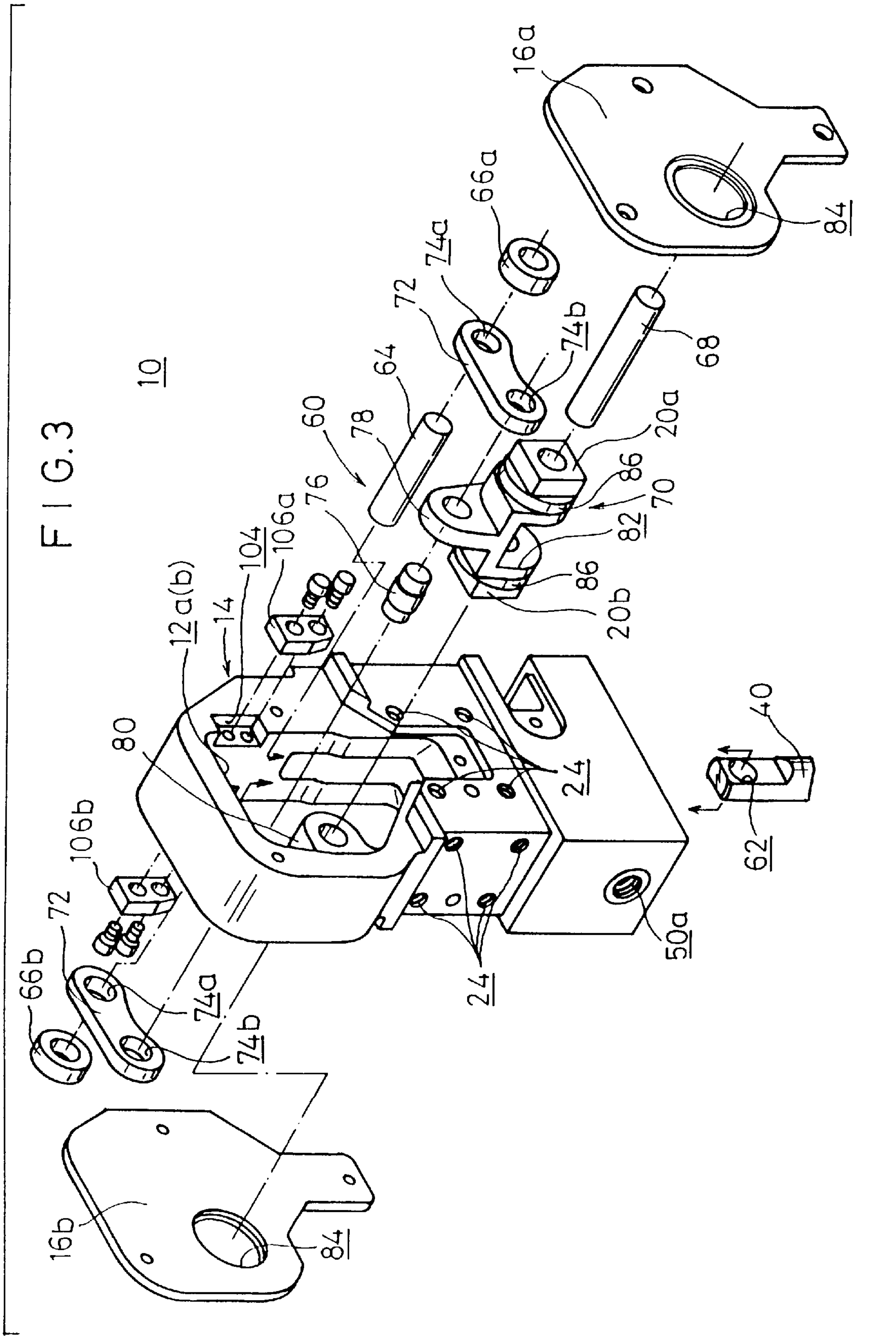
FIG. 3 shows an exploded perspective view of a body for constructing the cylinder apparatus shown in FIG. 1.

A toggle link mechanism 60 is provided at the one end of the piston rod 40, for converting the linear motion of the piston rod 40 into the rotational motion of the arm 22. As shown in FIG. 3, the toggle link mechanism 60 comprises a first pin member 64 which is rotatably supported by a hole 62 formed at the free end of the piston rod 40, and a pair of rollers 66*a*, 66*b* which are held at both ends of the first pin member 64. The toggle link mechanism 60 further comprises a support lever 70 which is rotatably supported with respect to the body 14 about a second pin member 68 as a support point, and a pair of link plates 72 which intervenes between the support lever 70 and the free end of the piston rod 40 and which links the support lever 70 to the free end of the piston rod 40.

That is, each of the link plates 72 is formed with a pair of holes 74*a*, 74*b* which are separated from each other by a predetermined spacing distance. The link plate 72 is coupled to the free end of the piston rod 40 via the first pin member 64 which is rotatably supported by one of the holes 74*a*, and the link plate 72 is coupled to a projection 78 of the support lever 70 via a third pin member 76 which is rotatably supported by the other hole 74*b*. In this embodiment, the pair of bearing sections 20*a*, 20*b* each having a rectangular cross section, which protrude to the outside from the cover members 16*a*, 16*b*, are formed at both ends of the support lever 70. A depression 82, which is fitted to a protrusion 80 formed integrally with the body 14, is formed between the pair of bearing sections 20*a*, 20*b*.

Therefore, the linear motion of the piston rod 40 is transmitted to the support lever 70 via the link plates 72. The support lever 70 is rotated in a predetermined direction about the second pin member 68 as a support point.

The bearing sections 20*a*, 20*b*, which are formed at the both ends of the support lever 70, are provided so that they are exposed to the outside through holes 84 of the cover members 16*a*, 16*b*. In this arrangement, circular step sections 86, which are formed adjacent to the bearing sections 20*a*, 20*b*, are inserted and fitted to the circular holes 84 of the cover members 16*a*, 16*b* respectively to close the holes 84. Thus, the body 14 is prevented from invasion of dust or the like which would otherwise enter the body 14 through the holes 84. The arm 22 is detachably connected to the bearing sections 20*a*, 20*b* by the aid of plates 87 fastened by screws (see FIG. 2).

Figure 7:
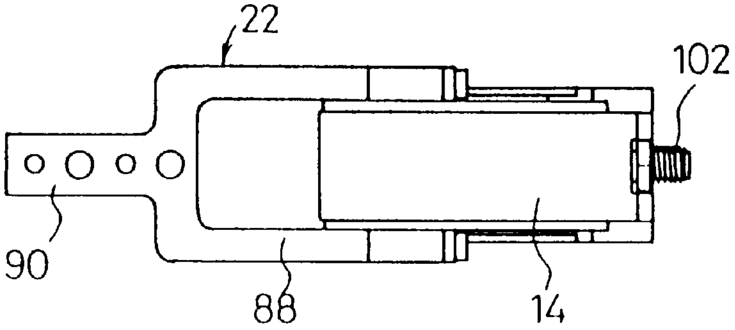
FIG. 7 shows a plan view illustrating a modified embodiment of the arm.
Figure 8:
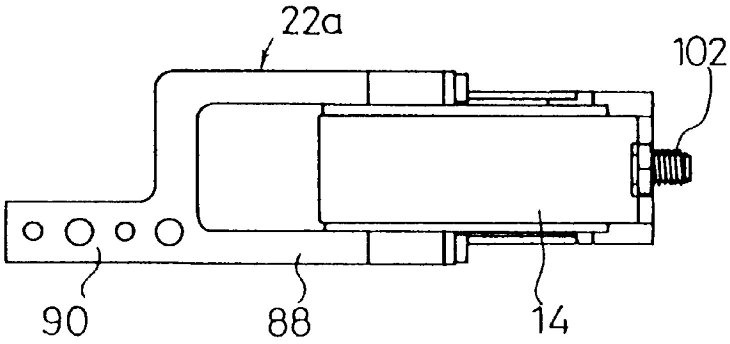
FIG. 8 shows a plan view illustrating another modified embodiment of the arm.
Figure 9:
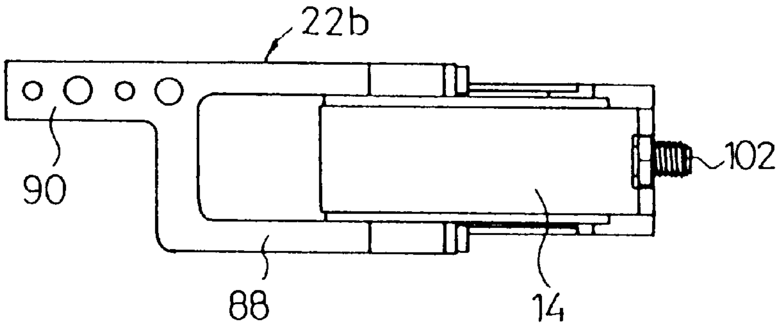
FIG. 9 shows a plan view illustrating still another modified embodiment of the arm.

The arm 22 may be constructed as follows. That is, as shown in FIG. 7, a clamp section 90 may be provided at the center of a main arm body 88. Alternatively, as shown in FIGS. 8 and 9, the arm 22*a*, 22*b* may be provided with a clamp section 90 on any one of sides deviated from the center of a main arm body 88.

Figure 2:
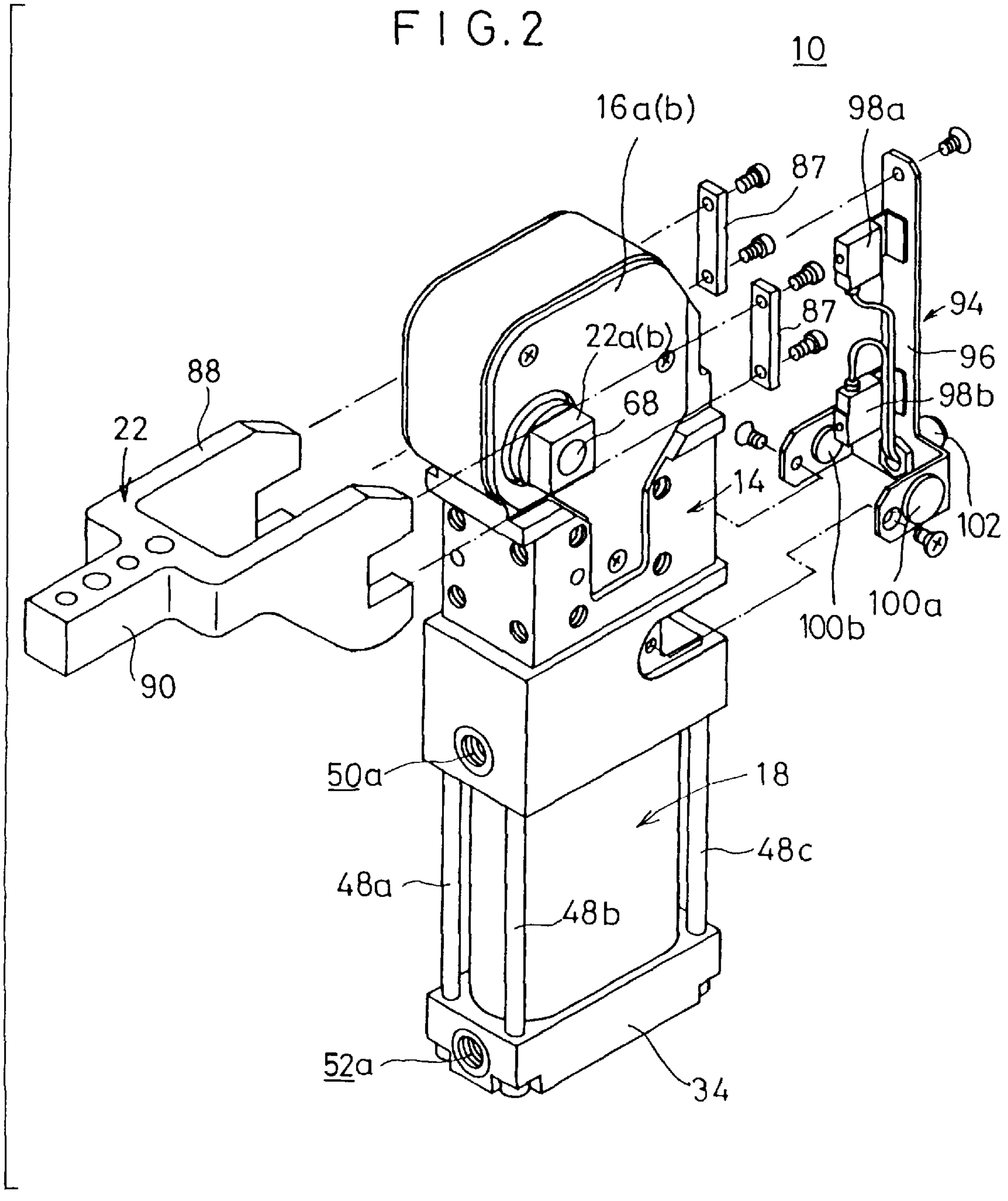
FIG. 2 shows a partial exploded perspective view of the cylinder apparatus shown in FIG. 1.

As shown in FIGS. 5 and 6, a hole 92 communicating with the chamber 56 is formed through a back surface of the body 14. A sensor unit 94 for detecting the amount of displacement of the piston 28 is installed to the hole 92. As shown in FIG. 2, the sensor unit 94 comprises a pair of proximity switches 98*a*, 98*b* which are fastened by screws to a substantially T-shaped plate 96 and separated from each other by a predetermined spacing distance, a pair of circular caps 100*a*, 100*b* which are detachably installed to holes provided in bent sections of the plate 96, and a connector 102 for transmitting detection signals outputted from the proximity switches 98*a*, 98*b* to an unillustrated external controller via lead wires connected to the proximity switches 98*a*, 98*b*. Alternatively, for example, unillustrated microswitches or pneumatic switches may be provided in place of the proximity switches 98*a*, 98*b*.

Figure 10A:
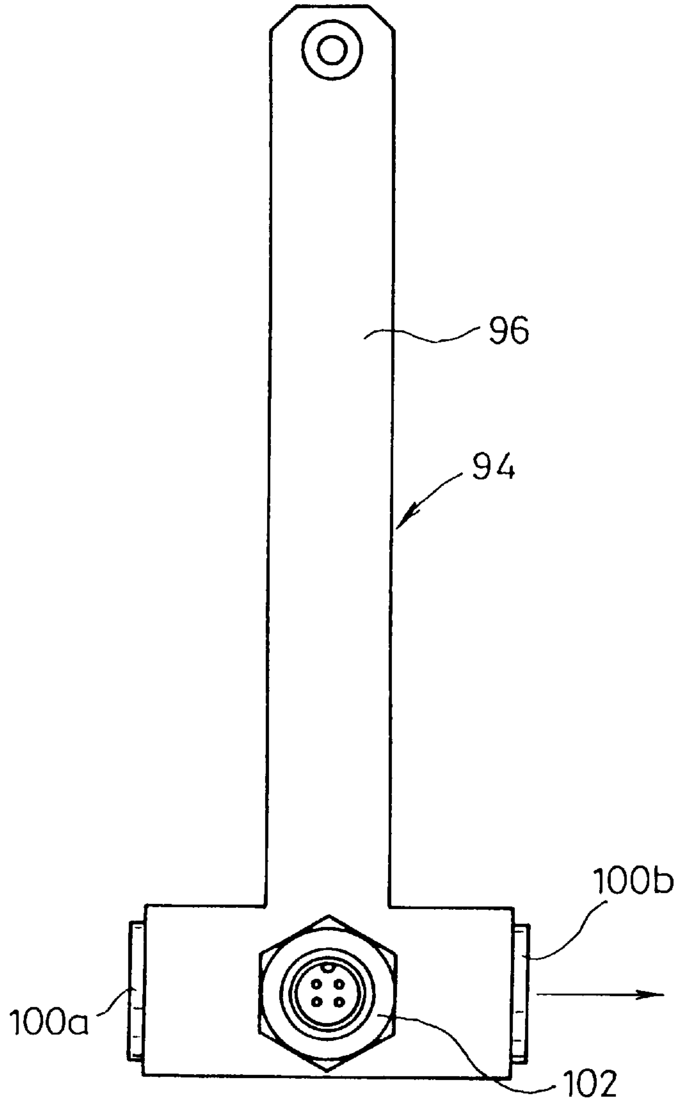
FIG. 10A and FIG. 10B shows plan views Illustrating attachment directions of a connector respectively.
Figure 10B:
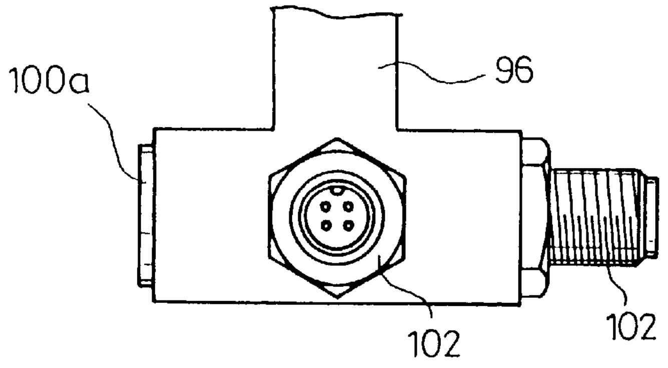

In this embodiment, the direction and the amount of displacement of the piston 28 can be detected by detecting a detection object 103 (see FIGS. 5 and 6) fixed at a predetermined position on the piston rod 40, by using the proximity switch 98*a* (98*b*). An operator can select any arbitrary direction from three directions to attach the connector 102 by removing the cap 100*b* (100*a*) installed to the plate 96 and installing another connector 102 (see FIGS. 10A and 10B). As shown in FIG. 3, the pair of cover members 16*a*, 16*b* for closing the openings 12*a* 12*b* of the body 14 respectively are fastened by screws. Accordingly, the cover members 16*a*, 16*b* can be attached and detached in a convenient manner.

As shown in FIG. 3, recesses 104 each having an oblong cross section are formed at upper portions of the openings 12*a*, 12*b* on the both sides of the body 14 respectively. A pair of reaction force-receiving plates 106*a*, 106*b* (reaction force-absorbing member) for engaging with the rollers 66*a*, 66*b* to absorb the reaction force are detachably fastened by screws to the recesses 104. Therefore, when the reaction force-receiving plates 106*a*, 106*b* wear out, they can be conveniently exchanged with new reaction force-receiving plates 106*a*, 106*b* after removing the cover members 16*a*, 16*b*.

The cylinder apparatus 10 according to the first embodiment of the present invention is basically constructed as described above. Next, its operation, function, and effect will be explained.

At first, the cylinder apparatus 10 is fixed at a predetermined position by the aid of an unillustrated fixing means. First ends of unillustrated tubes or pipes are connected to the pair of pressurized fluid inlet/outlet ports 50*a*, 52*a* respectively, and second ends of the tubes are connected to an unillustrated pressurized fluid supply source. FIG. 5 shows the cylinder apparatus 10 in an unclamping state, while FIG. 6 shows the cylinder apparatus 10 in a clamping state. Description will be made below by using the unclamping state shown in FIG. 5 as an initial position.

After the foregoing preparatory operation is completed, the unillustrated pressurized fluid supply source is operated for the cylinder apparatus 10 which provides the initial position shown in FIG. 5 so that the pressurized fluid is introduced into the cylinder chamber 38*a* through one of the pressurized fluid inlet/outlet ports 52*a*. The piston 28 is pressed in accordance with the action of the pressurized fluid introduced into the cylinder chamber 38*a*, and the piston 28 is raised along the cylinder chamber 38*a*. During this process, the linear accuracy of the piston 28 and the piston rod 40 is maintained owing to the guiding function effected by the wear ring 42 which is installed to the outer circumferential surface of the piston 28 and the bush 58 which surrounds the outer circumferential surface of the piston rod 40.

The linear motion of the piston 28 is transmitted to the toggle link mechanism 60 via the piston rod 40, and it is converted into the rotational motion of the arm 22.

That is, the linear motion (upward movement) of the piston 28 effects the force to upwardly press the link plates 72 which are rotatably coupled to the fee end of the piston rod 40. The pressing force acting on the link plates 72 allows the link plates 72 to rotate by a predetermined angle about the first pin member 64 as the support point, and the force allows the support lever 70 to rotate in a direction of an arrow A about the second pin member 68 as the support point. Therefore, the arm 22 is rotated by a predetermined angle in a direction of an arrow B about the support lever 70 as the support point.

Accordingly, the arm 22 arrives at a previously and initially set clamping position in accordance with the rotating action of the arm 22. Thus, the clamping state for a workpiece W is achieved as shown in FIG. 6. In this state, the axis C of the piston rod 40 is substantially parallel to the axis D of the support lever 70. Moreover, the rollers 66*a*, 66*b*, which are coupled to the free end of the piston rod 40, are engaged with the reaction force-receiving plates 106*a*, 106*b*.

Figure 11:
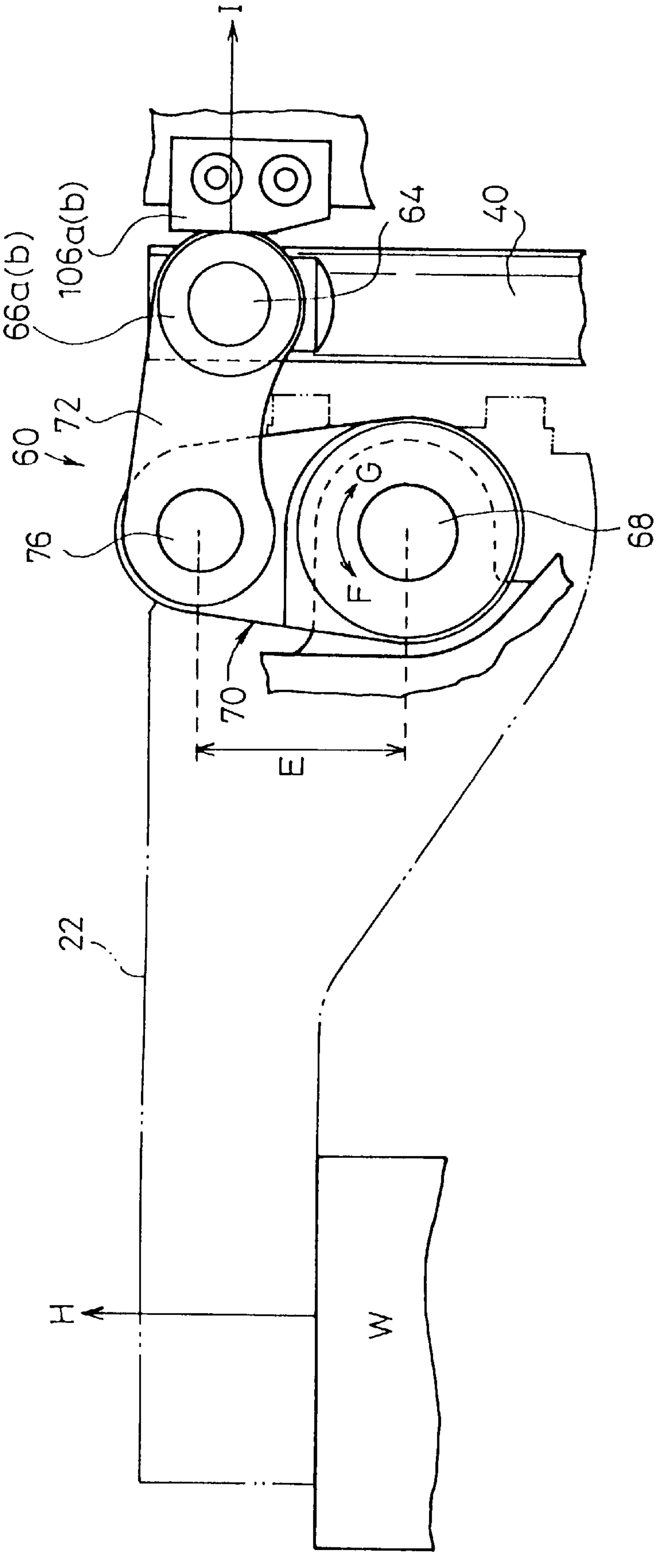
FIG. 11 shows a partial front view illustrating the reaction force applied to a toggle link mechanism.

In the clamping state, as shown in FIG. 11, the output of the cylinder apparatus 10 (pressing force of the piston 28) is transmitted to the support lever 70 in an enhanced manner in accordance with the action of the toggle link mechanism 60. A rotational torque, which is proportional to a length E of the support lever 70, is generated in a direction of an arrow F. Therefore, the arm 22 can reliably clamp the workpiece W in accordance with the action of the rotational torque.

When the workpiece W is clamped by the arm 22, a reaction force H in a direction opposite to the clamping force of the arm 22 is applied to the arm 22 as shown in FIG. 11. The reaction force H is transmitted to the toggle link mechanism 60 via the arm 22. The reaction force H acts as a force to rotate the support lever 70 in a direction of an arrow G about the second pin member 68 as the support point in the toggle link mechanism 60. The force, which is transmitted via the third pin member 76, acts as a force to press the link plates 72 and the rollers 66*a*, 66*b* in a direction of an arrow I.

Therefore, the reaction force H, which is applied when the workpiece W is clamped, finally acts as the force to press the rollers 66*a*, 66*b* in the direction of the arrow I. However, in this embodiment, the pressing force in the direction of the arrow I, which acts on the rollers 66*a*, 66*b*is held by the reaction force-receiving plates 106*a*, 106*b* provided on the inner wall surfaces of the body 14. Accordingly, the reaction force H is absorbed by the reaction force-receiving plates 106*a*, 106*b*.

On the other hand, in the state shown in FIG. 6, the pressurized fluid is supplied to the pressurized fluid inlet/outlet port 50 in accordance with a switching action of an unillustrated directional control valve so that the piston 28 is lowered. Accordingly, the support lever 70 is rotated in a direction opposite to the foregoing by the aid of the link plates 72 in accordance with the downward movement of the piston rod 40. Thus, the arm 22 is rotated in a direction to make separation from the workpiece W. As a result, the workpiece W is released from the clamping state, and the cylinder apparatus 10 is restored to the initial position shown in FIG. 5.

In this embodiment, the reaction force H, which is generated when the workpiece W is clamped, is absorbed by the reaction force-receiving plates 106*a*, 106*b* provided on the inner wall surfaces of the body 14. Moreover, the reaction force-receiving plates 106*a*, 106*b* are detachably attached by the aid of the screw members. Accordingly, when the reaction force-receiving plates 106*a*, 106*b* wear out, they can be conveniently replaced with new reaction force-receiving plates 106*a*, 106*b*.

Therefore, unlike the conventional technique, this embodiment does not adopt the arrangement in which the reaction force H is received by the guide groove formed on the inner wall surface of the casing. Accordingly, it is possible to avoid occurrence of any backlash and rotate the arm 22 in a stable manner. As a result, it is possible to avoid the decrease of the clamping force of the arm 22 for the workpiece W, which would be otherwise caused by the backlash.

In this embodiment, it is possible to conveniently perform maintenance by removing the cover members 16*a*, 16*b* which are fastened by the screws to the openings 12*a*, 12*b* of the body 14.

Figure 12:
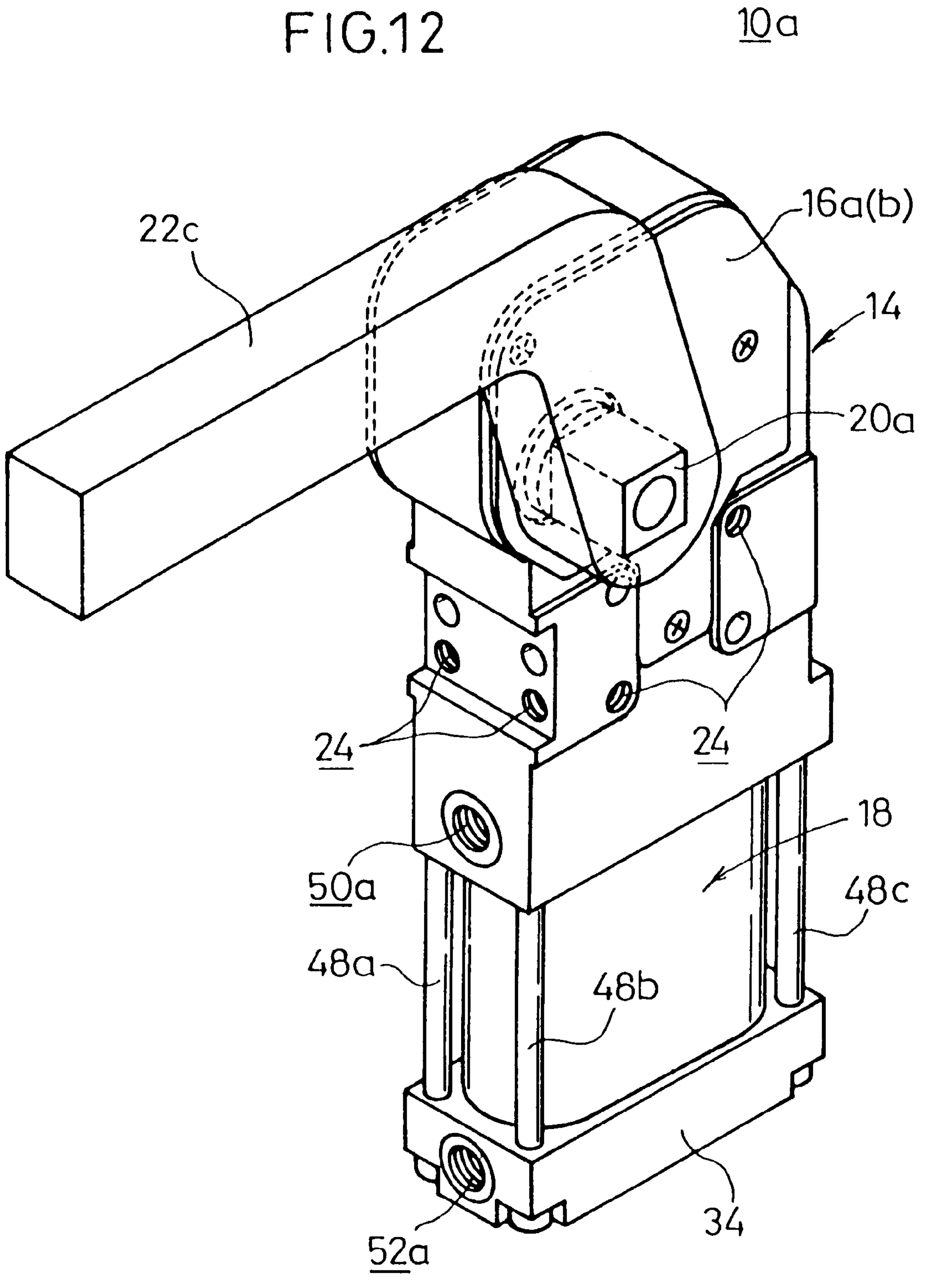
FIG. 12 shows a perspective view of a cylinder apparatus according to a second embodiment of the present invention.

Next, a cylinder apparatus 10*a* according to a second embodiment of the present invention is shown in FIG. 12.

In the cylinder apparatus 10*a*, only one bearing section 20*a*, which is formed on the support lever 70, is exposed to the outside from the cover member 16*a*. A thin type arm 22*c* having an L-shaped configuration is connected to the bearing section 20*a*. The thin type arm 22*c* connected as described above is advantageous in that the cylinder apparatus 10*a* can be installed in a narrow width space.

Next, a cylinder apparatus 110 according to a third embodiment of the present invention is shown in FIGS. 13 to 18. The same constitutive elements as those of the cylinder apparatuses 10, 10*a* shown in FIGS. 1 and 12 are designated by the same reference numerals, detailed explanation of which will be omitted.

Figure 15:
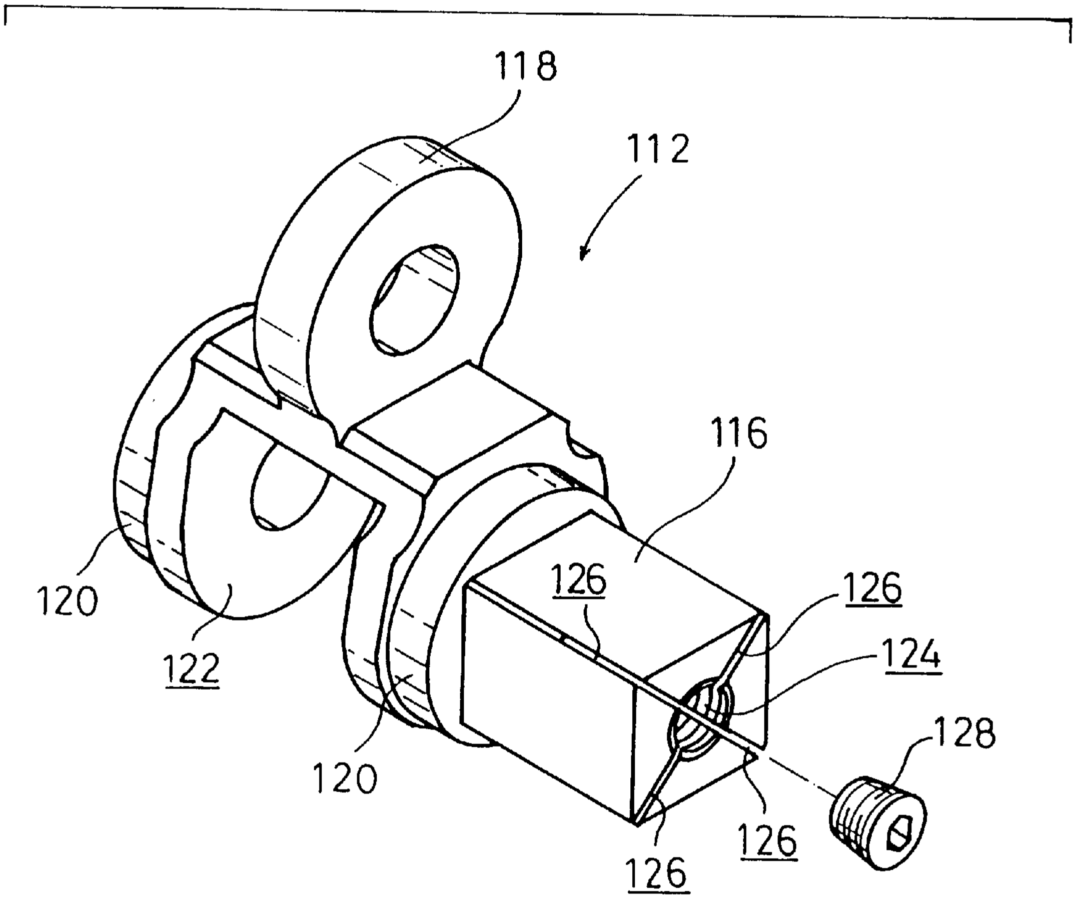
FIG. 15 shows a magnified perspective view of a support lever incorporated into the cylinder apparatus shown in FIG. 13.

The cylinder apparatus 110 is characterized in that the thin type arm 22*c*, which is provided for the cylinder apparatus 10*a* shown in FIG. 12, can be held in an exchangeable manner on the right or left side of the body 14 by changing the assembling direction of a support lever 112 provided in the body 14 (see FIG. 15).

Figure 14:
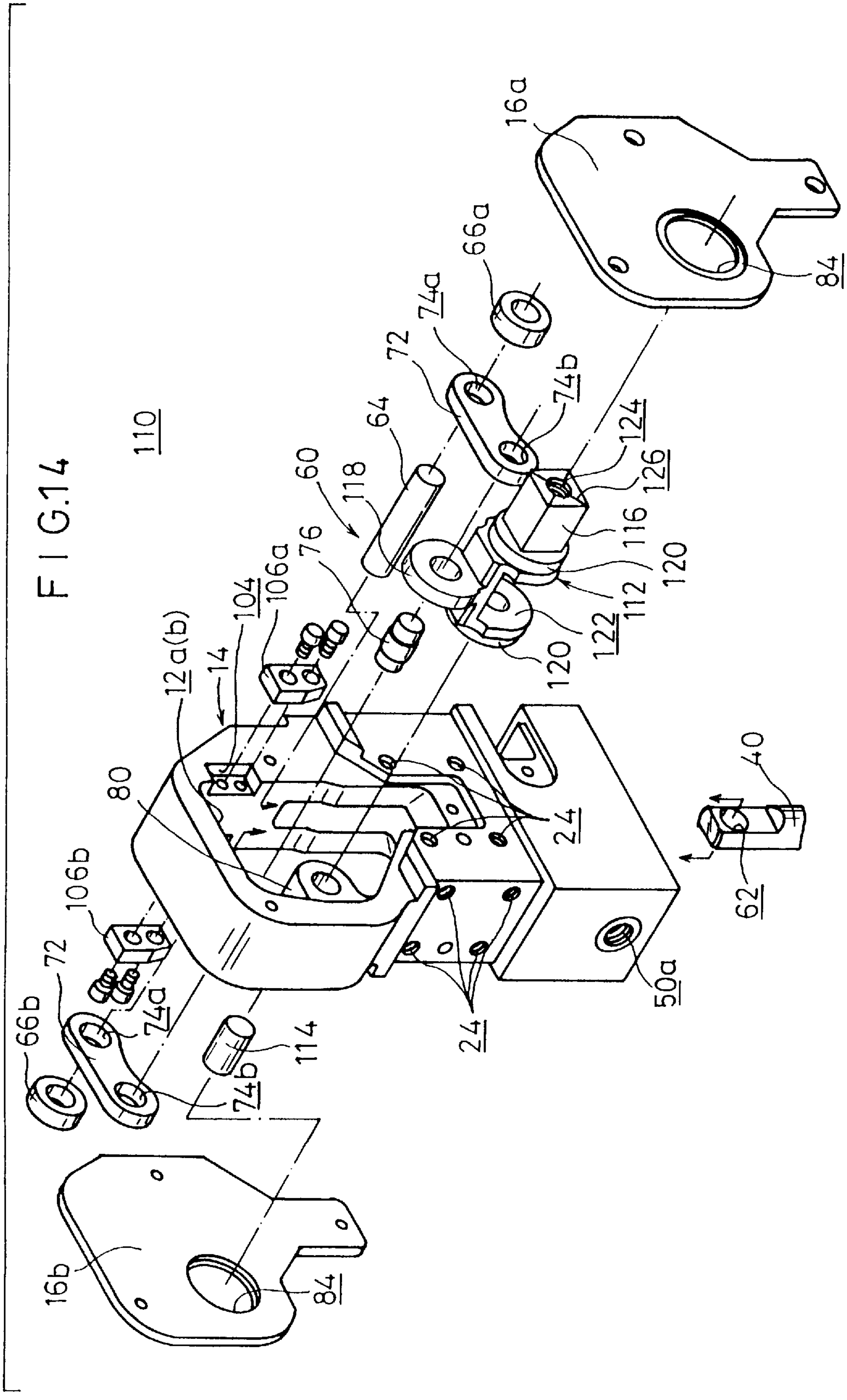
FIG. 14 shows an exploded perspective view of a body for constructing the cylinder apparatus shown in FIG. 13.

That is, as shown in FIG. 14, the support lever 112, which is rotatably supported on the body 14 about the support point of a second pin member 114, is provided in the body 14 for constructing the cylinder apparatus 110. A bearing section 116 having a square-shaped cross section is provided at one end of the support lever 112 so that it protrudes toward the outside through the hole 84 of one of the cover members 16*a*.

Reference numeral 118 indicates a projection which is coupled to the pair of link plates 72 by the aid of the third pin member 76 rotatably supported thereon. Reference numeral 120 indicates a pair of step sections to be inserted and fitted to the circular holes 84 of the cover members 16*a*, 16*b*. Reference numeral 122 indicates a depression which is formed between the pair of step sections 120 and which is fitted to the protrusion 80 of the body 14.

As shown in FIG. 15, a screw hole 124 having a tapered cross section is formed at a central portion of the bearing section 116 of the support lever 112. The bearing section 116 is formed with slits 126 which communicate with the screw hole 124 in the diagonal directions from four corners and which extend by a predetermined length along the axial direction of the bearing section 116.

Figure 17A:
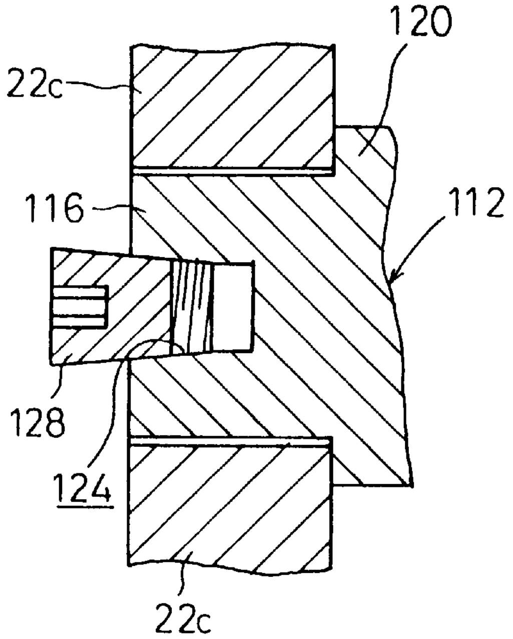
FIG. 17A and FIG. 17B show partial longitudinal sectional views of a screw plug to be screwed Into a screw hole provided in a bearing section.
Figure 17B:
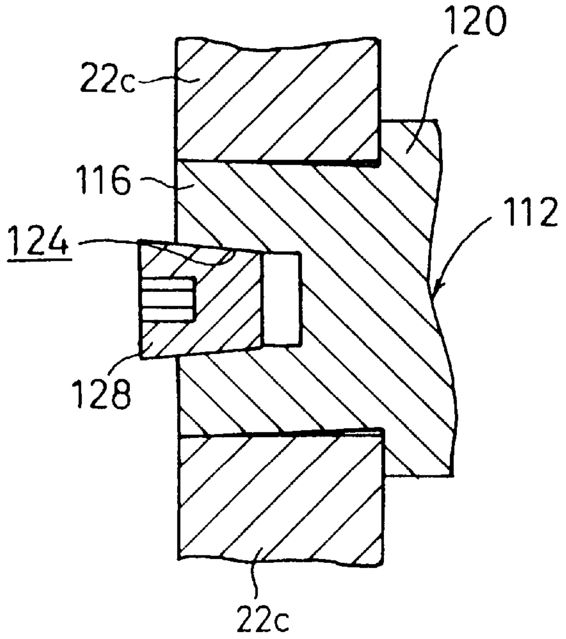

A screw plug 128 having a tapered cross section is fitted to the screw hole 124 of the bearing section 116. As shown in FIGS. 17A and 17B, the width of the bearing section 116 is increased outwardly by the aid of the slits 126 by increasing the screwing amount of the screw plug 128. As a result, the arm 22*c* can be detachably coupled by the aid of the bearing section 116.

Figure 13:
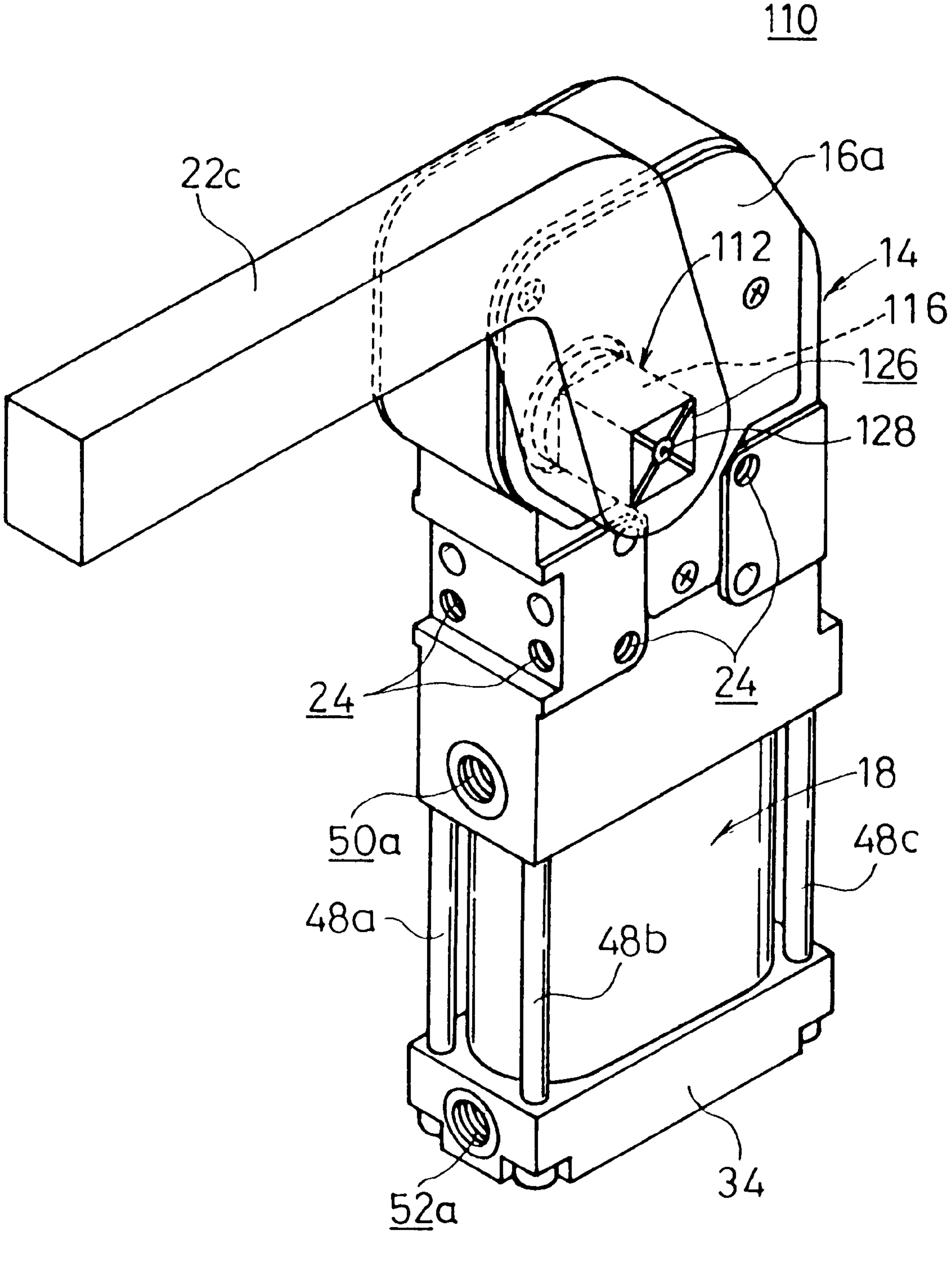
FIG. 13 shows a perspective view of a cylinder apparatus according to a third embodiment of the present invention.
Figure 18:
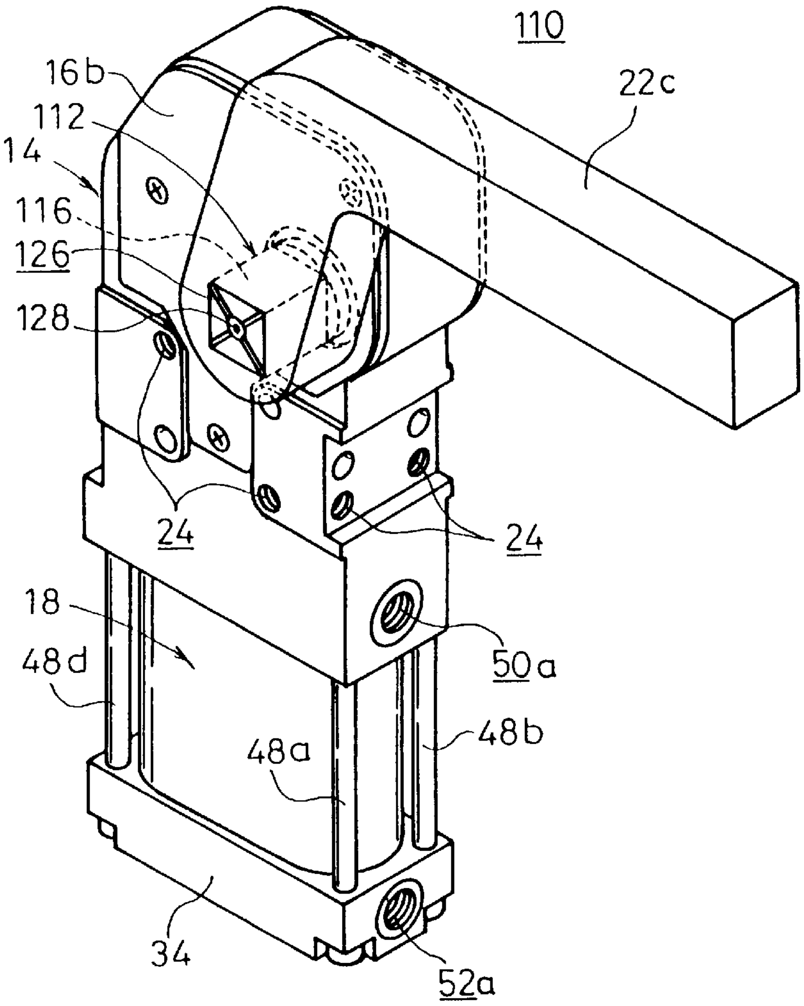
FIG. 18 shows a perspective view illustrating a state in which the cylinder apparatus of the right arm type shown in FIG. 13 is reassembled into the cylinder apparatus of the left arm type.

Explanation will now be made for the operation for reassembling the cylinder apparatus 110 shown in FIG. 13 in which the arm 22*c* is held on the right side surface of the body 14 (hereinafter referred to as "right arm type cylinder apparatus") into the cylinder apparatus 110 shown in FIG. 18 in which the arm 22*c* is held on the left side surface of the body 14 (hereinafter referred to as "left arm type cylinder apparatus").

Figures 16A, 16B, 16C:
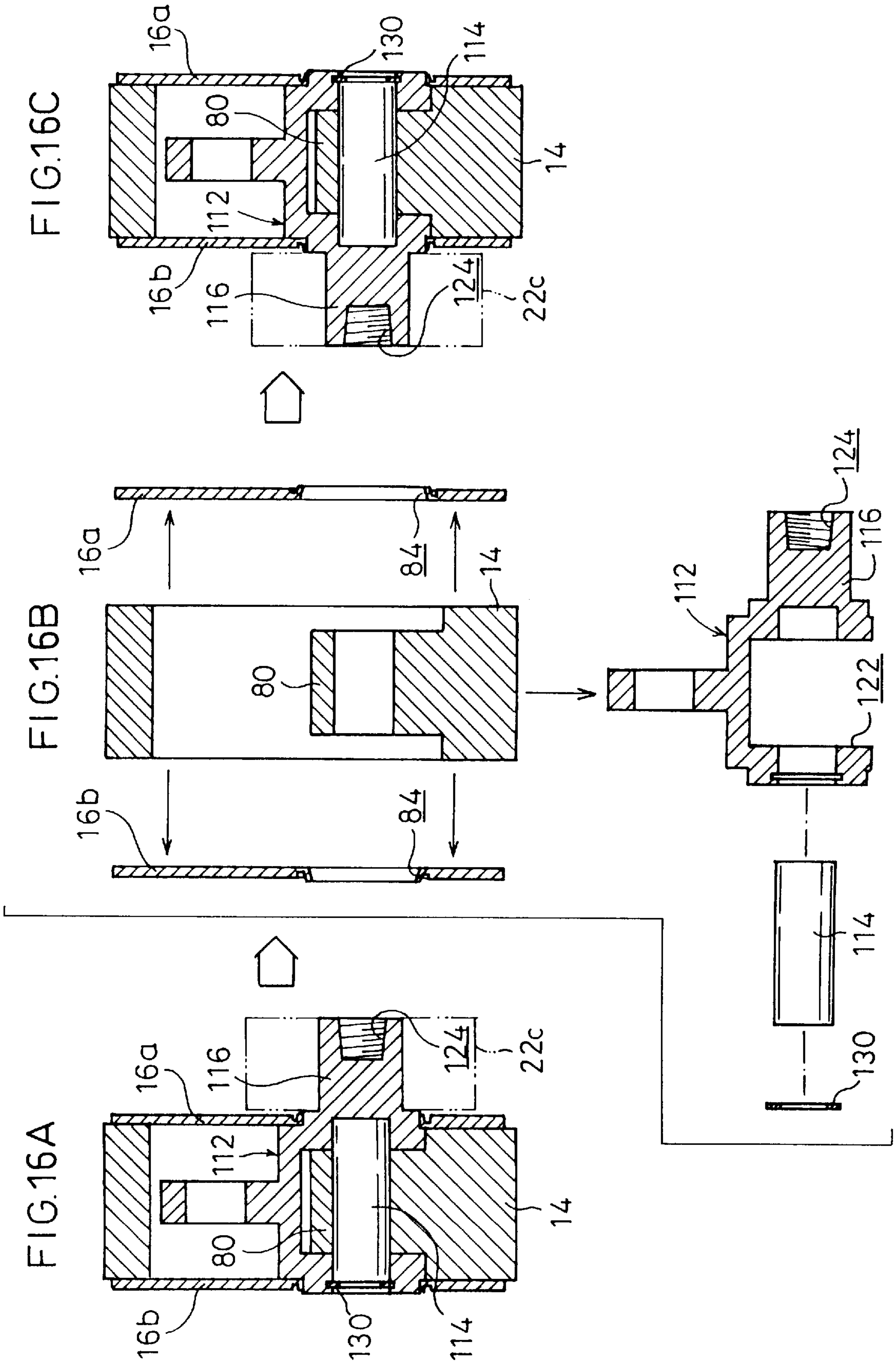
FIG. 16A to FIG. 16C show sectional views illustrating the procedure for reassembling the cylinder apparatus of the right arm type into the cylinder apparatus of the left arm type respectively.

At first, as shown in FIG. 16A, the screw plug 128, which has been screwed into the screw hole 124 of the bearing section 116 of the right arm type cylinder apparatus 110, is loosened. Thus, the width of the bearing section 116 is decreased inwardly. Accordingly, the arm 22*c*, which has been held by the bearing section 116, is removed.

Subsequently, as shown in FIG. 16B, the pair of cover members 16*a*, 16*b*, which have been fastened by screws to the mutually opposing upper portions of the body 14, are removed respectively. After that, the second pin member 114, which has been inserted into the hole, is extracted, and the support lever 112 is separated from the protrusion 80 of the body 14 through the depression 122. Thus, the support lever 112 can be removed from the body 14. Reference numeral 130 indicates a clip for fastening the second pin member 114 to the support lever 112.

The support lever 112, which has been removed from the body 14 as described above, is rotated by 180 degrees in a direction opposite to the foregoing direction. After that, as shown in FIG. 16C, the support lever 112 is incorporated into the inside of the body 14 so that the bearing section 116 is located on the left surface side of the body 14.

That is, the second pin member 114 is inserted into the hole of the support lever 112, and the depression 122 is used to fit the support lever 112 to the protrusion 80 of the body 14. The cover members 16*a*, 16*b* are installed to the body 14 respectively. Thus, the left arm type cylinder apparatus 110 is completed as shown in FIG. 18.

It is a matter of course that when the left arm type cylinder apparatus 110 is reassembled into the right arm type cylinder apparatus 110, an assembling operation may be performed in an order opposite to that described above.

As described above, according to the cylinder apparatus 110 concerning this embodiment, it is possible to alternately and conveniently reassemble the right arm type cylinder apparatus 110 into the left arm type cylinder apparatus 110. Therefore, it is unnecessary to prepare two cylinder apparatuses of the right arm type and the left arm type. The user can obtain the desired cylinder apparatus 110 of the right arm type or the left arm type by appropriately reassembling the apparatus depending on the environment of use.

Figure 19:
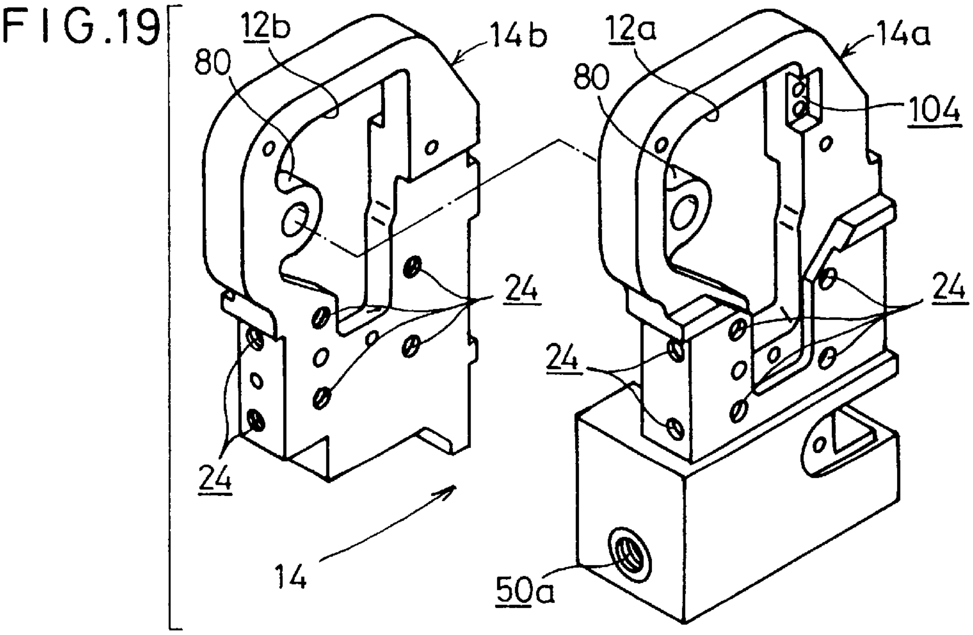
FIG. 19 shows an exploded perspective view of an example in which a body is divided.

In each of the cylinder apparatuses 10, 10*a*, and 110 according to the first, second, and third embodiments, respectively, the body 14 is integrally formed. However, the present invention is not limited to these embodiments, the body 14 may be divided into a first body 14*a* and a second body 14*b*, as shown in FIG. 19.

What is claimed is:

1. A cylinder apparatus comprising:

a body having a flat rectangular parallelepiped shape;

a cylinder unit connected to one end of said body, for accommodating a piston which is reciprocatable along a cylinder chamber;

a toggle link mechanism provided in said body, for converting linear motion of a piston rod connected to said piston into a rotational motion;

an arm connected to said toggle link mechanism, for making rotation by a predetermined angle in accordance with a driving action of said cylinder unit;

a reaction force-absorbing member detachably disposed in said body for absorbing a reaction force applied when a workpiece is clamped;

a pair of mutually opposing openings formed in said body, and a pair of cover members respectively closing said openings, said cover members having holes therein through which bearing members protrude, said arm being detachably coupled to said bearing members externally of said body; and a pair of plates fastenable to said arm for securing said arm to said bearing member.

2. A cylinder apparatus comprising:

a body having a flat rectangular parallelepiped shape;

a cylinder unit connected to one end of said body, for accommodating a piston which is reciprocatable along a cylinder chamber;

a toggle link mechanism provided in said body, for converting linear motion of a piston rod connected to said piston into rotational motion;

an arm connected to said toggle link mechanism, for making rotation by a predetermined angle in accordance with a driving action of said cylinder unit; and a reaction force-absorbing member detachably disposed in said body for absorbing a reaction force applied when a workpiece is clamped, wherein said reaction force-absorbing member comprises a reaction force-receiving plate fastened by screws to an upper portion in an opening of said body, and said reaction force-receiving plate is provided to engage with a roller connected to a free end of said piston rod.

3. A cylinder apparatus comprising:

a body having a flat rectangular parallelepiped shape;

a cylinder unit connected to one end of said body, for accommodating a piston which is reciprocatable along a cylinder chamber;

a toggle link mechanism provided in said body, for converting linear motion of a piston rod connected to said piston into rotational motion;

an arm connected to said toggle link mechanism, for making rotation by a predetermined angle in accordance with a driving action of said cylinder unit; and a reaction force-absorbing member detachably disposed in said body for absorbing a reaction force applied when a workpiece is clamped, wherein said toggle link mechanism comprises rollers connected to a free end of said piston rod via a first pin member, a support lever rotatably supported by a second pin member with respect to said body, and link plates for linking said free end of said piston rod to said support lever.

4. The cylinder apparatus according to claim 3, wherein a pair of bearing sections, which protrude outwardly through holes of a pair of cover members and which are coupled to said arm, are formed at both ends of said support lever.

5. The cylinder apparatus according to claim 3, wherein a bearing section, which protrudes outwardly through a hole of a cover member and which is coupled to said arm, is formed at one end of said support lever.

6. The cylinder apparatus according to claim 1, wherein said cylinder unit comprises a cylinder tube composed of a cylinder having an oblong cross section, said piston having a shape which corresponds to the cross section of said cylinder tube, and an end block for closing one end of said cylinder tube.

7. The cylinder apparatus according to claim 5, wherein said arm is selectively provided on one side surface or the other side surface of said body, said side surfaces being mutually opposed to one another, by removing said support lever from said body, rotating said support lever by 180 degrees, and reassembling said support lever in an opposite direction.

8. The cylinder apparatus according to claim 4, wherein said arm comprises a main arm body held by said pair of bearing sections protruding outwardly from side surfaces of said body respectively, and a clamp section for making abutment against said workpiece to press said workpiece, and wherein said clamp section is provided at a central portion of said main arm body.

9. The cylinder apparatus according to claim 4, wherein said arm comprises a main arm body held by said pair of bearing sections protruding outwardly from side surfaces of said body respectively, and a clamp section for making abutment against said workpiece to press said workpiece, and wherein said clamp section is provided on any one of sides deviated from a central portion of said main arm body.

* * * * *